US011182481B1

(12) United States Patent
Oliver et al.

(10) Patent No.: US 11,182,481 B1
(45) Date of Patent: Nov. 23, 2021

(54) EVALUATION OF FILES FOR CYBER THREATS USING A MACHINE LEARNING MODEL

(71) Applicant: Trend Micro Incorporated, Tokyo (JP)

(72) Inventors: Jonathan James Oliver, Kew (AU); Chia-Yen Chang, Taipei (TW); Wen-Kwang Tsao, Taipei (TW); Li-Hsin Hsu, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 288 days.

(21) Appl. No.: 16/527,575

(22) Filed: Jul. 31, 2019

(51) Int. Cl.
*H04L 29/06* (2006.01)
*G06F 21/56* (2013.01)
*G06F 16/903* (2019.01)
*G06K 9/62* (2006.01)
*G06N 20/00* (2019.01)

(52) U.S. Cl.
CPC .......... *G06F 21/565* (2013.01); *G06F 16/903* (2019.01); *G06K 9/6267* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,865,947 B2 | 1/2011 | Fanton et al. | |
| 8,375,450 B1 | 2/2013 | Oliver et al. | |
| 8,769,683 B1 | 7/2014 | Oliver | |
| 8,925,087 B1 | 12/2014 | Oliver et al. | |
| 9,197,665 B1 | 11/2015 | Cabot et al. | |
| 9,361,458 B1 | 6/2016 | Feng et al. | |
| 9,690,937 B1 | 6/2017 | Duchin et al. | |
| 9,690,938 B1 | 6/2017 | Saxe et al. | |
| 10,162,926 B2 * | 12/2018 | Hsu | G06F 30/394 |
| 10,162,967 B1 | 12/2018 | Oliver et al. | |

(Continued)

FOREIGN PATENT DOCUMENTS

EP    1 678 635 B1    10/2013

OTHER PUBLICATIONS

Trend Micro Security Intelligence Blog—How Machine Learning echniquest Helped US find Massive Certificate Abuse by BroweFox, Jun. 11, 2018, 8 pages, available at https://blog.trendmicro.com/trendlabs-security-intelligence/how-machine-learning-techniques-helped-US-find-massive-certificate-abuse-by-browsefox/.

(Continued)

*Primary Examiner* — Cai Y Chen
(74) *Attorney, Agent, or Firm* — Patrick D. Benedicto

(57) ABSTRACT

A system for evaluating files for cyber threats includes a machine learning model and a locality sensitive hash (LSH) repository. When the machine learning model classifies a target file as normal, the system searches the LSH repository for a malicious locality sensitive hash that is similar to a target locality sensitive hash of the target file. When the machine learning model classifies the target file as malicious, the system checks if response actions are enabled for the target file. The system reevaluates files that have been declared as normal, and updates the LSH repository in the event of false negatives. The system disables response actions for files that have been reported as false positives.

20 Claims, 5 Drawing Sheets

(56) References Cited

U.S. PATENT DOCUMENTS

2007/0240217 A1* 10/2007 Tuvell .................. G06F 21/565
726/24

OTHER PUBLICATIONS

Wikipedia—Locality-sentive hashing, 8 pages [retrieved on May 20, 2019], retrieved from the internet: https://wikipedia.org/wiki/Locality-sensitive_hashing.

Joris Kinable, et al. "Malware Classification based on Call Graph Clustering", Aug. 27, 2010, pp. 1-12, Aalto University, Dept. of Information and Computer Science, Finland.

Swathi Pai, et al. "Clustering for malware classification", published online on Jan. 27, 2016, 13 pages, J Comput virol Hack Tech.

Peng Li, et al. "On Challenges in Evaluating Malware Clustering", 2010, 18 pages.

Kyle Soska, et al. "Automatic Application Identification from Billions of Files", Aug. 13, 2017, 10 pages.

Roberto Perdisci, et al. "VAMO: Towards a Fully Automated Malware Clustering Validity Analysis", Dec. 3-7, 2012, 10 pages.

PeHash: A Novel Approach to Fast Malware Clustering, Dec. 7, 2008, 8 pages.

Irfan Ui Haq, et al. "Malware Lineage in the Wild", Oct. 14, 2017, 15 pages.

Usha Narra "Clustering versus SVM for Malware Detection", May 2015, 71 pages, Master's Theses and Graduate Research, Dept. of Computer Science, San Jose State University, San Jose, California.

Mark Stamp "A Survey of Machine Learning Algorithms and Their Application in Information Security", Sep. 2018, 23 pages, San Jose State University, San Jose, California.

Jakub Lokoc, et al. "k-NN Classification of Malware in HTTPS Traffic Using the Metric Space Approach", Apr. 2016, 16 pages, SIRET research group, Dept. of Software Engineering, Charles University, Prague, Czech Republic.

Joy Nathalie Avelino, et al. "Ahead of the Curve: A Deeper Understanding of Network Threats Through Machine Learning", 2018, 17 pages, Trend Micro, A TrendLabs Research Paper.

* cited by examiner

EVALUATION OF FILES FOR CYBER THREATS USING A MACHINE LEARNING MODEL

BACKGROUND OF THE INVENTION

1. Field of the Invention

The present invention relates generally to cybersecurity, and more particularly but not exclusively to evaluation of files for cyber threats.

2. Description of the Background Art

A computer file ("file") may be evaluated for cyber threats using a machine learning model. For example, samples of files that have been confirmed as malicious may be used as training data to build and train a machine learning model. A machine learning model may evaluate a target file by looking for tell-tale features of maliciousness, which the machine learning model learned from the sample files. Examples of machine learning models include neural nets, decision trees, decision forests, voting schemes, nearest neighbor, etc. Advantageously, its training allows the machine learning model to detect new and mutated malicious files. However, a machine learning model may still yield false negative (i.e., failing to detect a malicious file) and false positive (i.e., incorrectly classifying a normal file as malicious) results. Correcting false negatives and false positives requires retraining of the machine learning model, which takes a relatively long time.

SUMMARY

In one embodiment, a system for evaluating files for cyber threats includes a machine learning model and a locality sensitive hash (LSH) repository. When the machine learning model classifies a target file as normal, the system searches the LSH repository for a malicious locality sensitive hash that is similar to a target locality sensitive hash of the target file. When the machine learning model classifies the target file as malicious, the system checks if response actions are enabled for the target file. The system reevaluates files that have been declared as normal, and updates the LSH repository in the event of false negatives. The system disables response actions for files that have been reported as false positives.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of systems, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
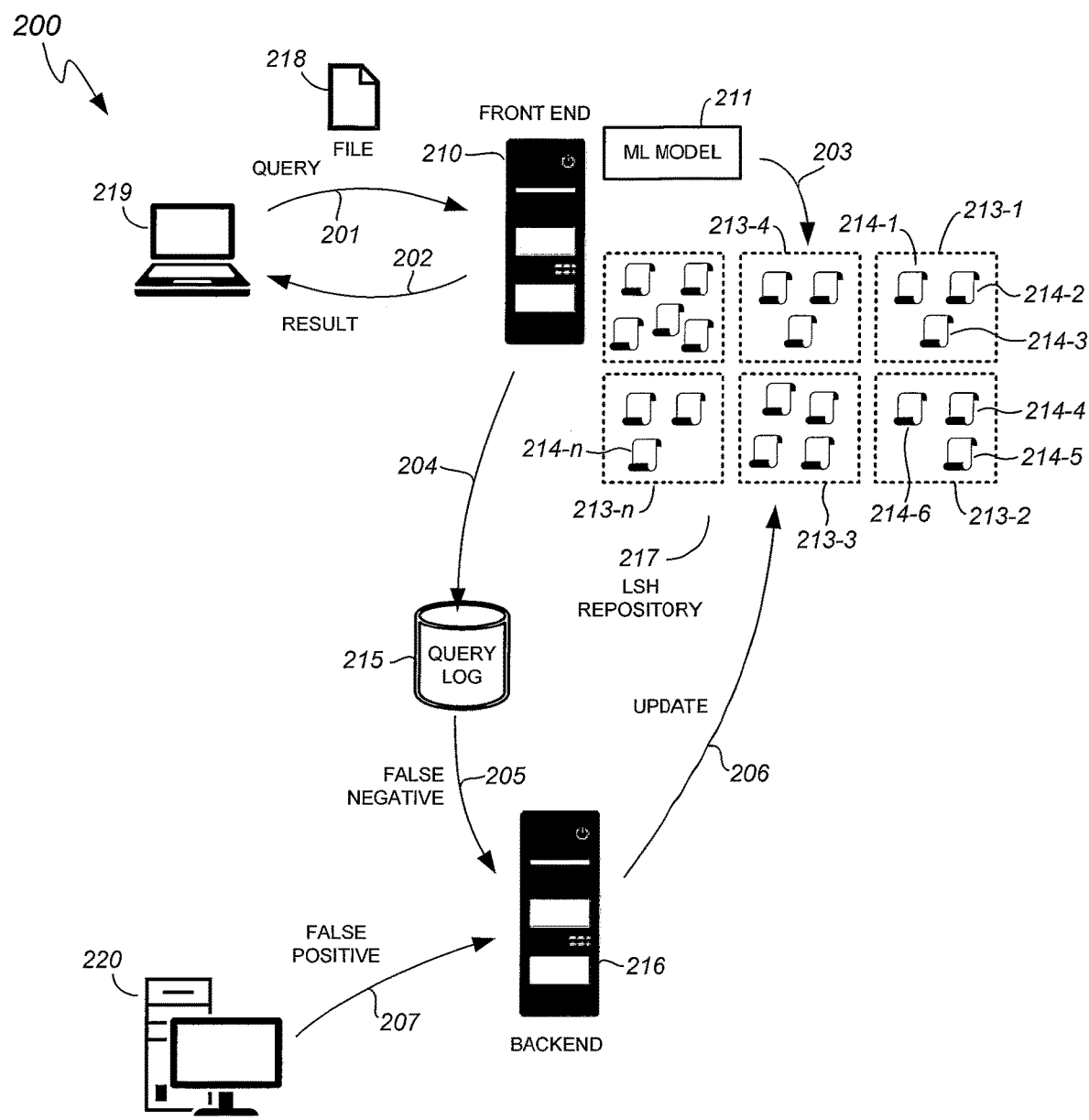
FIG. 1 shows a system for evaluating files for cyber threats in accordance with an embodiment of the present invention.

FIG. 1 shows a system 200 for evaluating files for cyber threats in accordance with an embodiment of the present invention. In the example of FIG. 1, the system 200 includes a front end system 210 and a backend system 216. As can be appreciated, the functionality of the front end system 210 and the backend system 216 may be integrated in the same computer system or distributed among multiple computer systems.

The front end system 210 may comprise a computer and associated software for providing a file evaluation service in real time. In the example of FIG. 1, the front end system 210 includes a machine learning model 211 for detecting malicious files, e.g., viruses, worms, advanced persistent threats, Trojans, and other cyber threats. In one embodiment, the machine learning model 211 is built and trained using a gradient boosting algorithm. Other suitable machine learning algorithm may also be employed. The machine learning model 211 may be trained using samples of files that are known to be malicious. Such sample files may be obtained from honeypots, submissions, and other sources. Various features of the sample files may be used in the training of the machine learning model 211, including header data, file size, opcodes used, sections, etc.

In the example of FIG. 1, the front-end system 210 includes a locality sensitive hash (LSH) repository 217. The LSH repository 217 may comprise storage hardware (e.g., data storage device, memory) and associated software for storing and accessing file digests, which in the example of FIG. 1 are in the form of locality sensitive hashes 214 (i.e., 214-1, 214-2, . . . , 214-*n*). A locality sensitive hash 214 may be generated using a suitable locality sensitive hashing algorithm. In one embodiment, the locality sensitive hashes 214 and other locality sensitive hashes described herein are all generated using the Trend Micro Locality Sensitive Hash (TLSH) algorithm. Open source program code of the TLSH algorithm is generally available on the Internet and other sources.

Generally speaking, a locality sensitive hashing algorithm may extract many very small features (e.g., 3 bytes) of a file and put the features into a histogram, which is encoded to generate the digest of the file. Unlike other types of hashes, such as an SHA-1 hash, small changes to a file will result in different but very similar locality sensitive hashes. That is, with a suitable locality sensitive hashing algorithm like the TLSH algorithm, a file and small changes to the file will likely yield different but very similar locality sensitive hashes.

The mathematical distance between locality sensitive hashes of two files may be calculated to determine similarity of the two files. As an example, the distance between locality sensitive hashes of two files may be calculated using an approximate Hamming distance algorithm. Generally speaking, the Hamming distance between two locality sensitive hashes of equal length is a measure of the differences between positions of the locality sensitive hashes. The lower the Hamming distance, the more similar the locality sensitive hashes and thus the files. Locality sensitive hashes may be deemed to be similar when they are within a threshold mathematical distance; the threshold mathematical distance may be adjusted based on false positive/false negative requirements. Other suitable mathematical distance or approximate distance algorithm may also be employed to measure similarity of locality sensitive hashes.

The similarity between locality sensitive hashes may also be determined using a clustering algorithm, such as in FIG. 1. In the example of FIG. 1, the locality sensitive hashes 214 are grouped into a plurality of clusters 213 (i.e., 213-1, 213-2, . . . , 213-n), with each cluster 213 comprising locality sensitive hashes 214 that are similar to one another. It is to be noted that only some of the clusters 213 and locality sensitive hashes 214 are labeled in FIG. 1 for clarity of illustration.

The locality sensitive hashes 214 may be grouped using a suitable clustering algorithm, such as the K-nearest neighbors (KNN) clustering algorithm, Density-based spatial clustering of applications with noise (DBSCAN) clustering algorithm, ANN clustering algorithm, hierarchical clustering algorithm, etc. A target (i.e., being evaluated) locality sensitive hash may be deemed to be similar to a particular cluster 213 having members that are most similar to the target locality sensitive hash relative to members of other clusters 213. In that case, the target locality sensitive hash may be deemed to be a member of the particular cluster 213.

Each cluster 213 may have a corresponding center. A center of a cluster 213, which is also in the format of a locality sensitive hash, is representative of the locality sensitive hashes 214 of the cluster 213. A center of a cluster 213 may be described as an average, median, or some other relationship between the members of the cluster 213, depending on the clustering algorithm employed. When a target locality sensitive hash is received for similarity determination, the target locality sensitive hash may be compared to the centers of the clusters 213 to identify a particular cluster 213 having a center that is most similar to the target locality sensitive hash relative to the centers of other clusters 213. In that case, the target locality sensitive hash is deemed to be a member of the particular cluster 213.

A file, locality sensitive hash of the file, or other object may have a corresponding label that indicates whether the object is malicious or normal. A cluster 213 may have a label that reflects the labels of its members, i.e., labels of locality sensitive hashes 214 that form the cluster 213. For example, a particular cluster 213 consisting entirely of malicious locality sensitive hashes 214 may be labeled as malicious. In that example, when a target locality sensitive hash is similar to the center of the particular cluster 213, the target locality sensitive hash is also labeled as malicious. Similarly, a target locality sensitive hash may be labeled as normal when the target locality sensitive hash is similar to a center of a cluster 213 that is labeled as normal.

In the case where the members of a cluster 213 do not have the same label, the labeling of the cluster 213 may be based on a percentage or other ratio of the labels of its members. For example, a cluster 213 having at least 90% malicious locality sensitive hashes 214 may be labeled as malicious. Generally speaking, the labeling of a cluster 213 to reflect the labels of its members depends on several criteria including false positive/false negative requirements.

In the example of FIG. 1, the front end system 210 receives a query (see arrow 201) for a target file 218. The query inquires whether the file 218 is malicious or normal. In response to the query, the front end system 210 returns a result (see arrow 202), which indicates whether the file 218 is malicious or normal. The query may be received from a computer 219 of a user over the Internet, for example. In one embodiment, the query includes the file 218, in which case the front end system 210 applies a locality sensitive hashing algorithm on the file 218 to generate a target locality sensitive hash of the file 218. In other embodiments, the query includes the target locality sensitive hash but not the file 218, in which case the front end system 210 receives the file 218 from some other source.

In response to the query, the front end system 210 uses the machine learning model 211 to evaluate the file 218. More particularly, the front end system 210 may input the file 218 to the machine learning model 211, which classifies the file 218. Depending on implementation details of the machine learning model 211, features may be extracted from the file 218, the contents of the file 218 loaded in memory, or some other form of the file 218 and input to the machine learning model 211 for classification. In one embodiment, the machine learning model 211 gives a positive result when the file 218 is classified as malicious, and a negative result when the file 218 is classified as normal (i.e., not malicious).

In the example of FIG. 1, the front end system 210 consults the LSH repository 217 when the machine learning model 211 classifies the file 218 as normal (see arrow 203). The front end system 210 searches the LSH repository 217 for a malicious locality sensitive hash (i.e., a locality sensitive hash that is labeled as malicious) that is similar to the target locality sensitive hash. The malicious locality sensitive hash may be a single locality sensitive hash 214 or, when the locality sensitive hashes 214 in the LSH repository 217 have been clustered, a center of a cluster 213.

The front end system 210 may declare the target locality sensitive hash, and thus the file 218, to be normal when the machine learning model 211 classifies the file 218 as normal and the target locality sensitive hash is not similar to a malicious locality sensitive hash in the LSH repository 217. The front end system 210 may also declare the target locality sensitive hash to be normal when the machine learning model 211 classifies the file 218 as normal and the target locality sensitive hash is similar to a normal locality sensitive hash (i.e., a locality sensitive hash that is labeled as normal) in the LSH repository 217. The front end system 210 returns a negative result in response to the query to indicate that the target file has been declared to be normal.

One or more response actions may be performed against a malicious file. The response actions may include deleting the malicious file, putting the malicious file in quarantine, blocking network traffic containing the malicious file, and/or other actions that prevent the malicious file from being executed in a computer. A response action may be performed by one or more computer systems that are part of the system 200, including user computers (e.g., computers 219 and 220) that work in conjunction with the system 200.

In one embodiment, when the machine learning model 211 classifies the file 218 as malicious, the front end system 210 checks if response actions for the file 218 have been disabled. If response actions are enabled for the file 218, the front end system 210 declares the file 218 to be malicious and accordingly returns a positive result in response to the query. Otherwise, when the machine learning model 211 classifies the file 218 as malicious but response actions for the file 218 have been disabled, the front end system 210 declares the file 218 to be normal and returns a negative result in response to the query.

In the example of FIG. 1, the front end system 210 logs (see arrow 204) queries, including results and other data associated with the queries, in a query log 215. The query log 215 may comprise storage hardware and associated software for storing and accessing query data. The query log 215 may be maintained by the front end system 210, backend system 216, or other computer system of the system 200.

The backend system 216 may comprise a computer and associated software for performing off-line evaluation of files that have been previously evaluated by the front end system 210, receiving feedback on previous evaluations performed by the front end system 210, updating the LSH repository 217 in accordance with the off-line evaluations, and disabling response actions based on received feedbacks.

In one embodiment, target files that have been declared by the front end system 210 to be normal are identified in the query log 215 and then reevaluated for cyber threats. The reevaluation of the target files may be performed more thoroughly, compared to simply using the machine learning model 211, using an off-line evaluation procedure, such as by sandboxing, human review, pattern matching, etc. The reevaluation allows for identification of false negatives, which occur when the front end system 210 incorrectly declares a malicious file to be normal.

More particularly, when an entry in the query log 215 indicates that a query for a particular file is returned a negative result, the backend system 216 may retrieve the particular file from the query log 215 or other source. The backend system 216 may reevaluate the particular file for cyber threats using cybersecurity evaluation procedures that are more extensive than the machine learning model 211. When the reevaluation indicates that the particular file is actually malicious, the backend system 216 may declare a false negative, such as by marking a corresponding entry in the query log 215. The backend system 216 may retrieve a particular locality sensitive hash of the particular file from the entry in the query log 215 (see arrow 205) and update (see arrow 206) the LSH repository 217 to indicate that the particular locality sensitive hash is malicious. For example, the backend system 216 may label the particular locality sensitive hash as malicious and add the particular locality sensitive hash in the LSH repository 217. This way, when the same particular file is subsequently classified as normal by the machine learning model 211, the particular locality sensitive hash will be detected as similar to the malicious particular locality sensitive hash in the LSH repository 217 or a center of a malicious cluster 213 that includes the malicious particular locality sensitive hash as a member. Advantageously, a subsequent false negative result for the particular file is prevented without having to wait for retraining of the machine learning model 211.

In the example of FIG. 1, the backend system 216 is configured to receive feedbacks (see arrow 207) from users of the system 200 regarding false positives, which occur when the front end system 210 incorrectly declares a normal file to be malicious. The backend system 216 may receive a feedback from a computer 220 of a user over the Internet, for example.

In one embodiment, in response to a feedback regarding a false positive file, i.e., a normal file that has been incorrectly declared to be malicious, the backend system 216 disables response actions for the false positive file. For example, the locality sensitive hash of the false positive file may be placed in a whitelist, thereby bypassing evaluation of the false positive file by the machine learning model 211 or other components of the system 200. As another example, the locality sensitive hash of the false positive file may be labeled as normal in the LSH repository 217. Yet another example, the locality sensitive hash of the false positive file may be labeled as normal and added to a normal file repository, which can be consulted to allow components of the system 200 to identify the false positive file as normal. Advantageously, by disabling response actions for the false positive file, a subsequent false positive classification of the false positive file by the machine learning model 211 will have no detrimental effect, without having to wait for retraining of the machine learning model 211. Files for which response actions are disabled may be listed in the query log 215, a whitelist (e.g., see FIG. 2, whitelist 275), a normal file repository (e.g., see FIG. 2, normal file repository 272) or other listing that is accessible to the components of the system 200.

Figure 2:
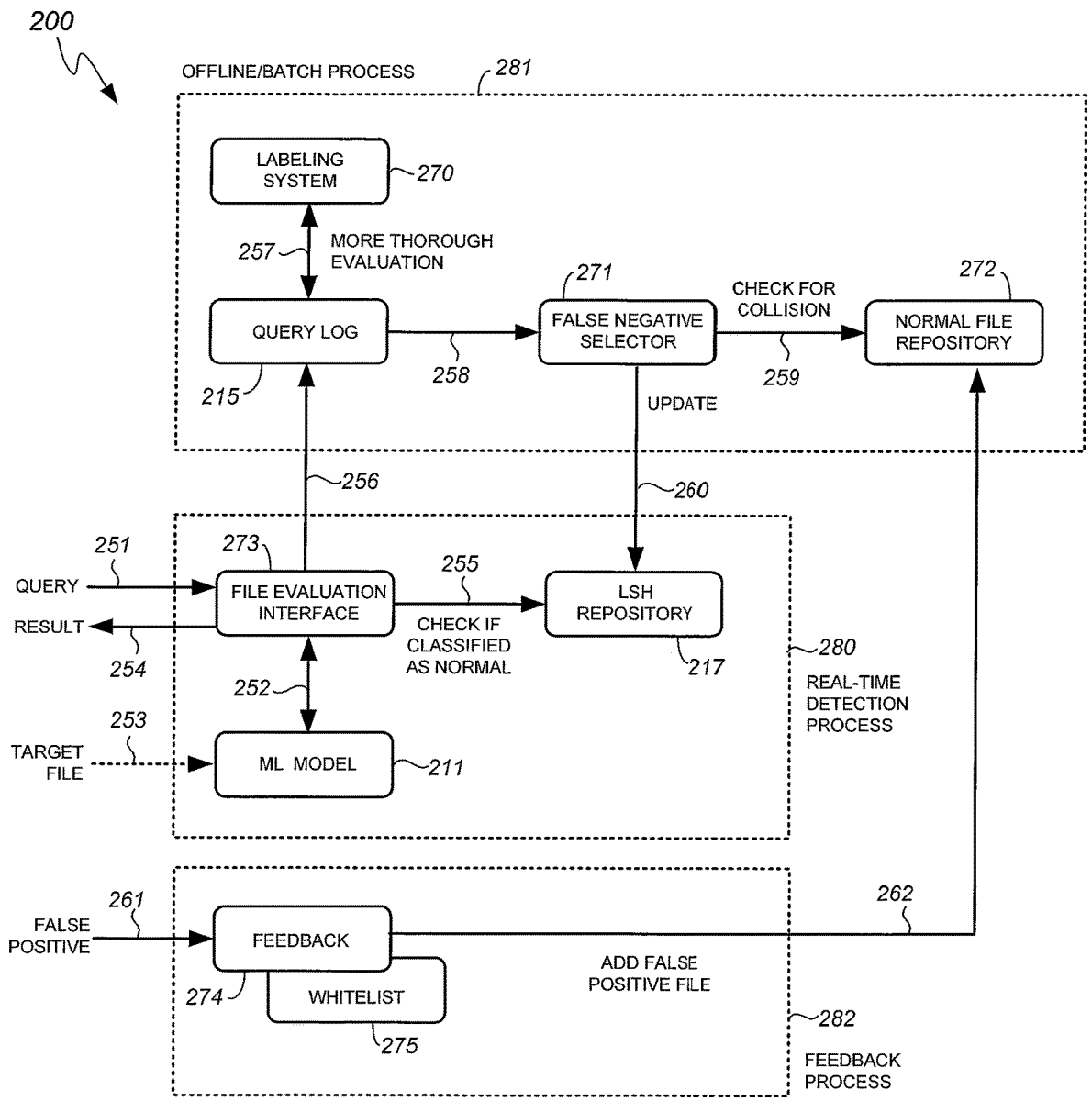
FIG. 2 shows a logical diagram that further illustrates the system of FIG. 1, in accordance with an embodiment of the present invention.

FIG. 2 shows a logical diagram that further illustrates the system 200, in accordance with an embodiment of the present invention. In the example of FIG. 2, a real-time detection process 280 may be performed by the front end system 210, and the off-line/batch process 281 and the feedback process 282 may be performed by the backend system 216. As can be appreciated, the aforementioned processes may be performed in a single computer system or distributed among two or more computer systems.

In the example of FIG. 2, a file evaluation interface 273 may comprise an application programming interface (API) that works in conjunction with a computer that sends a query for a target file. The file evaluation interface 273 may be configured to receive the query (see arrow 251) and other data associated with the query. In response to the query, the file evaluation interface 273 initiates classification of the target file by the machine learning model 211 (see arrow 252). The file evaluation interface 273 may receive the target file as part of the query, and pass the target file to the machine learning model 211 for classification. The machine learning model 211 may also receive the target file from some other source (see arrow 253), such as from another channel, a different session, external file repository, etc.

The file evaluation interface 273 may generate a target locality hash of the target file or receive the target locality hash as part of the query. When the machine learning model 211 classifies the target file as normal, the file evaluation interface 273 determines if the target locality sensitive hash is similar to a malicious locality sensitive hash in the LSH repository 217 (see arrow 255). The target file is declared to be normal when the machine learning model 211 classifies the target file as normal, and the target locality sensitive hash is not similar to a malicious locality sensitive hash in the LSH repository 217 or is similar to a normal locality sensitive hash in the LSH repository 217.

When the machine learning model 211 classifies the target file as malicious, the file evaluation interface 273 checks if response actions for the target file are enabled. If response actions for the target file are enabled, the file evaluation interface 273 declares the target file to be malicious. Otherwise, if response actions for the target file have been disabled, the file evaluation interface 273 declares the target file to be normal.

The file evaluation interface 273 returns a result (see arrow 254) in response to the query. In one embodiment, the file evaluation interface 273 returns a positive result when the target file is declared to be malicious, and returns a negative result when the target file is declared to be normal.

In the example of FIG. 2, the file evaluation interface 273 logs queries and relevant data to the query log 215 (see arrow 256). In one embodiment, a labeling system 270 comprises one or more cybersecurity modules for performing sandboxing, pattern matching, and/or other file evaluation. The labeling system 270 selects files that have been declared as normal, as noted in the query log 215, and reevaluates the selected files for cyber threats (see arrow 257). The labeling system 270 marks entries in the query log 270 for false negative files, i.e., files that have been previously declared as normal but subsequently found by the labeling system 270 to be malicious.

In one embodiment, a false negative selector 271 comprises software for identifying false negative files noted in the query log 215 (see arrow 258). The false negative selector 271 may be configured to label the locality sensitive hash of a false negative file as malicious, and update the LSH repository 217 with the malicious locality sensitive hash of the false negative file.

The normal file repository 272 may comprise storage hardware and associated software for storing and accessing files that have been confirmed as normal. The normal file repository 272 may comprise normal locality sensitive hashes of the normal files. Components of the system 200 may consult the normal file repository 272 to determine if any given file is normal. The false negative selector 271 may check for inconsistency, also referred to as "collision," between the false negative file and the normal files of the normal file repository 272 (see arrow 259). In the example of FIG. 2, the normal file repository 272 is searched for a normal locality sensitive hash of a normal file that is similar to the malicious locality sensitive hash of the false negative file. The LSH repository 217 is not updated with the malicious locality sensitive hash of the false negative file when the malicious locality sensitive hash of the false negative file is similar to a normal locality sensitive hash of a normal file in the normal file repository 272. In that case, the false negative file may be further analyzed to understand the collision. For example, the false negative file and the colliding normal file may be reviewed by a cybersecurity researcher.

In one embodiment, when the malicious locality sensitive hash of the false negative file is not similar to a normal locality sensitive hash of a normal file in the file repository 272, the false negative selector 271 updates the LSH repository 217 with the malicious locality sensitive hash of the false negative file. More particularly, the false negative selector 271 may add the malicious locality sensitive hash of the false negative file to the LSH repository 217 (see arrow 260). In the case where the locality sensitive hashes in the LSH repository 217 are clustered, the malicious locality sensitive hash of the false negative file may be clustered with the locality sensitive hashes in the LSH repository 217, and the centers of the clusters may be recalculated afterwards.

In one embodiment, a feedback module 274 comprises software for receiving feedbacks from users regarding false positive files, i.e., normal files that have been incorrectly declared as malicious, and for disabling response actions for the false positive files. To disable response actions for a false positive file, the locality sensitive hash of the false positive file may be relabeled as normal in the LSH repository 217, removed from the LSH repository 217, added in a whitelist 275, and/or added in the normal file repository 272 (see arrow 262), for example.

Figure 3:
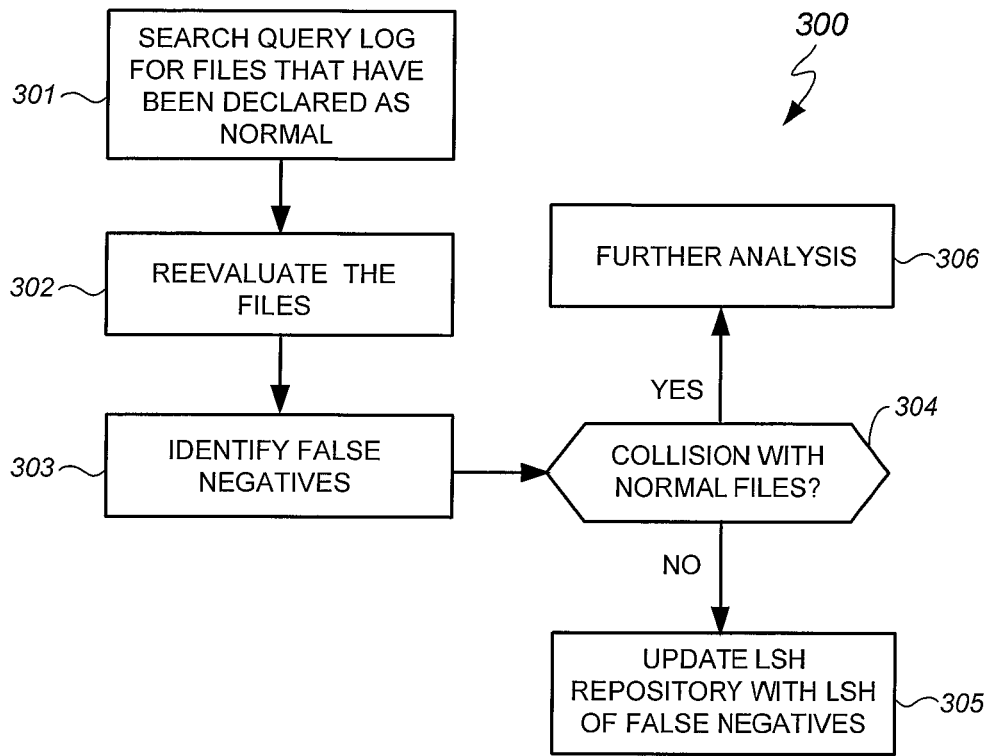
FIG. 3 shows a flow diagram of a method of addressing false negative classifications of a machine learning model in accordance with an embodiment of the present invention.

FIG. 3 shows a flow diagram of a method 300 of addressing false negative classifications of a machine learning model in accordance with an embodiment of the present invention. The method 300 may be performed by one or more components of the system 200 as shown in FIGS. 1 and 2.

In the example of FIG. 3, a query log is searched for files that have been declared as normal (step 301). Files that have been declared as normal are selected and reevaluated for cyber threats (step 302). Files that have been declared as normal but have been detected as malicious in the reevaluation are identified as false negative files (step 303). False negative files are checked for collision against normal files in a normal file repository (step 304). When there is no collision, an LSH repository is updated with the locality sensitive hashes of the false negative files (step 304 to step 305). Otherwise, in the event of a collision, further investigation may be performed to understand the collision (step 304 to step 306). A target locality sensitive hash of a target file that has been classified as normal by a machine learning model may be checked against the locality sensitive hashes of the LSH repository to prevent false negatives.

Figure 4:
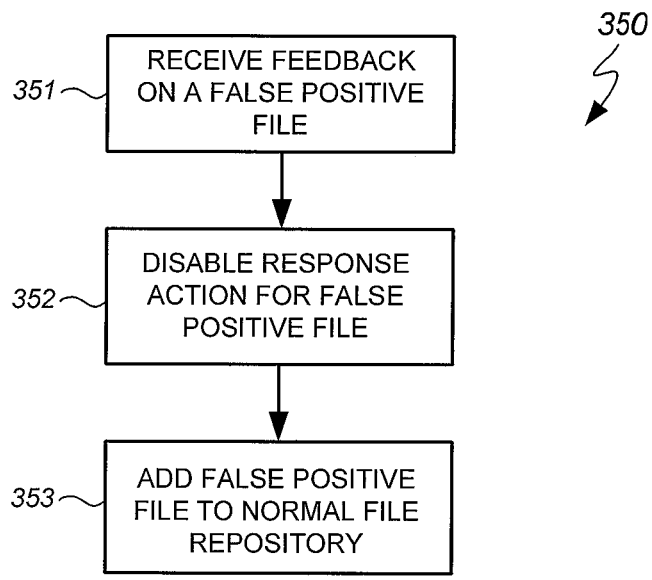
FIG. 4 shows a flow diagram of a method of addressing false positive classifications of a machine learning model in accordance with an embodiment of the present invention.

FIG. 4 shows a flow diagram of a method 350 of addressing false positive classifications of a machine learning model in accordance with an embodiment of the present invention. The method 350 may be performed by one or more components of the system 200 as shown in FIGS. 1 and 2.

In the example of FIG. 4, a user feedback on a false positive file is received (step 351). In response to the feedback, response actions for the false positive file are disabled (step 352). The false positive file, locality sensitive hash of the false positive file, or both are added to a normal file repository (step 353). Adverse effects of a subsequent false positive classification of the same false positive file by the machine learning model 211 are thus prevented.

As can be appreciated, false positive and false negative classifications of a machine learning model are more properly addressed by retraining the machine learning model with the corresponding false positive/false negative files. However, retraining the machine learning model takes time. Embodiments of the present invention advantageously address false positive and false negative classifications of a machine learning model, until such time that the machine learning model can be retrained.

Figure 5:
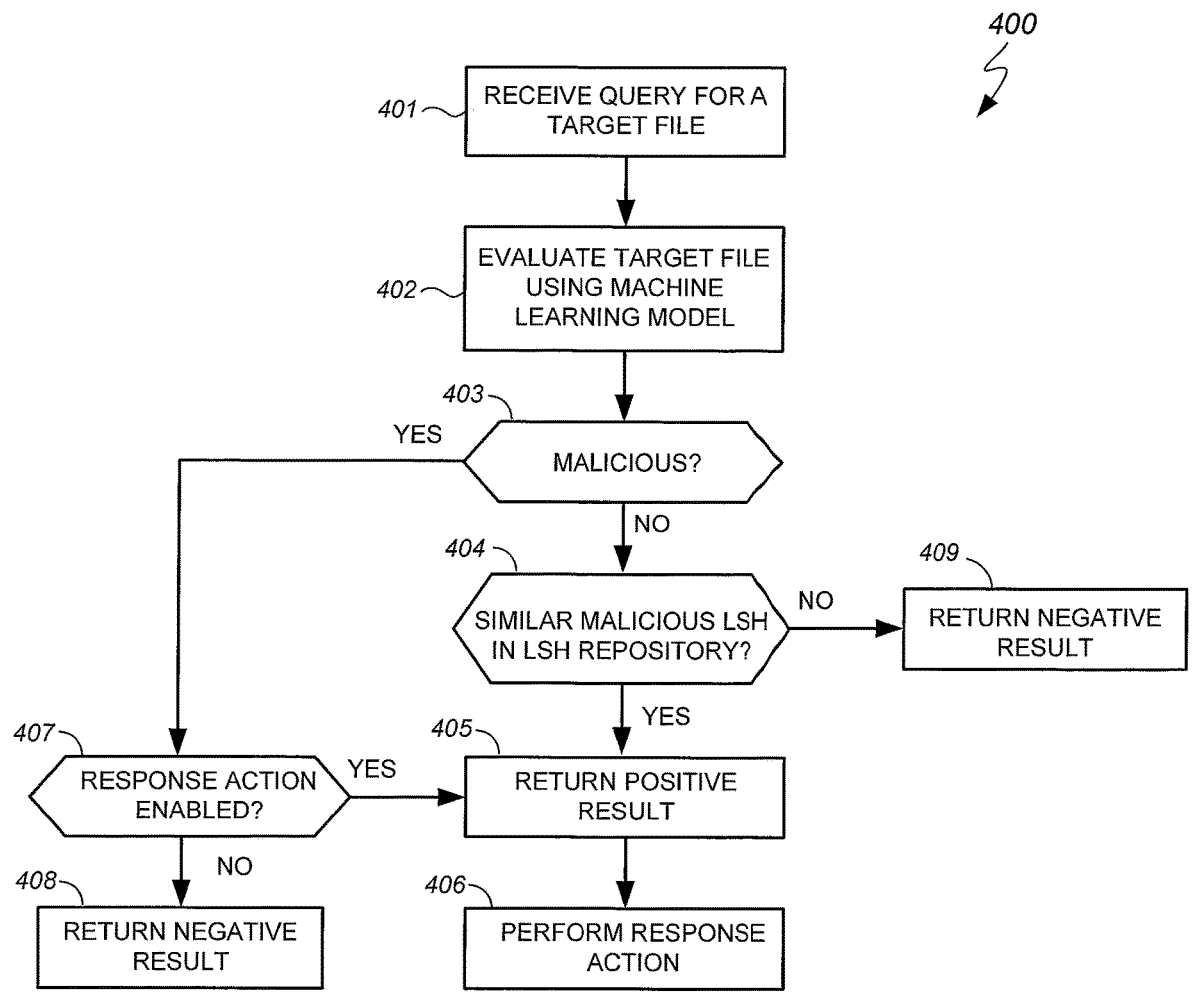
FIG. 5 shows a flow diagram of a method of evaluating a file for cyber threats in accordance with an embodiment of the present invention.

FIG. 5 shows a flow diagram of a method 400 of evaluating a file for cyber threats in accordance with an embodiment of the present invention. The method 400 may be performed by one or more components of the system 200 as shown in FIGS. 1 and 2.

In the example of FIG. 5, a query is received for a target file (step 401). The target file is evaluated for cyber threats using a machine learning model (step 402). When the machine learning model classifies the target file as malicious (step 403 to step 407) and response actions are enabled for the target file (step 407 to step 405), the target file is declared to be malicious and a positive result is returned in response to the query (step 405). In response to the target file being declared to be malicious, one or more response actions are performed against the target file (step 406).

When the machine learning model classifies the target file as malicious (step 403 to step 407) but response actions for the target file are disabled (step 407 to step 408), the target file is declared to be normal and a negative result is returned in response to the query (step 408).

When the machine learning model classifies the target file as normal (i.e., not malicious), an LSH repository is searched for a malicious locality sensitive hash that is similar to a target locality sensitive hash of the target file (step 403 to step 404). The target file is declared to be normal and a negative result is returned in response to the query when the target locality hash is not similar to a malicious locality sensitive hash in the LSH repository (step 404 to step 409). On the other hand, when the target locality sensitive hash is similar to a malicious locality sensitive hash in the LSH repository, the target file is declared to be malicious and a positive result is returned in response to the query (step 404 to step 405). In that case, one or more response actions are performed against the target file (step 406).

Figure 6:
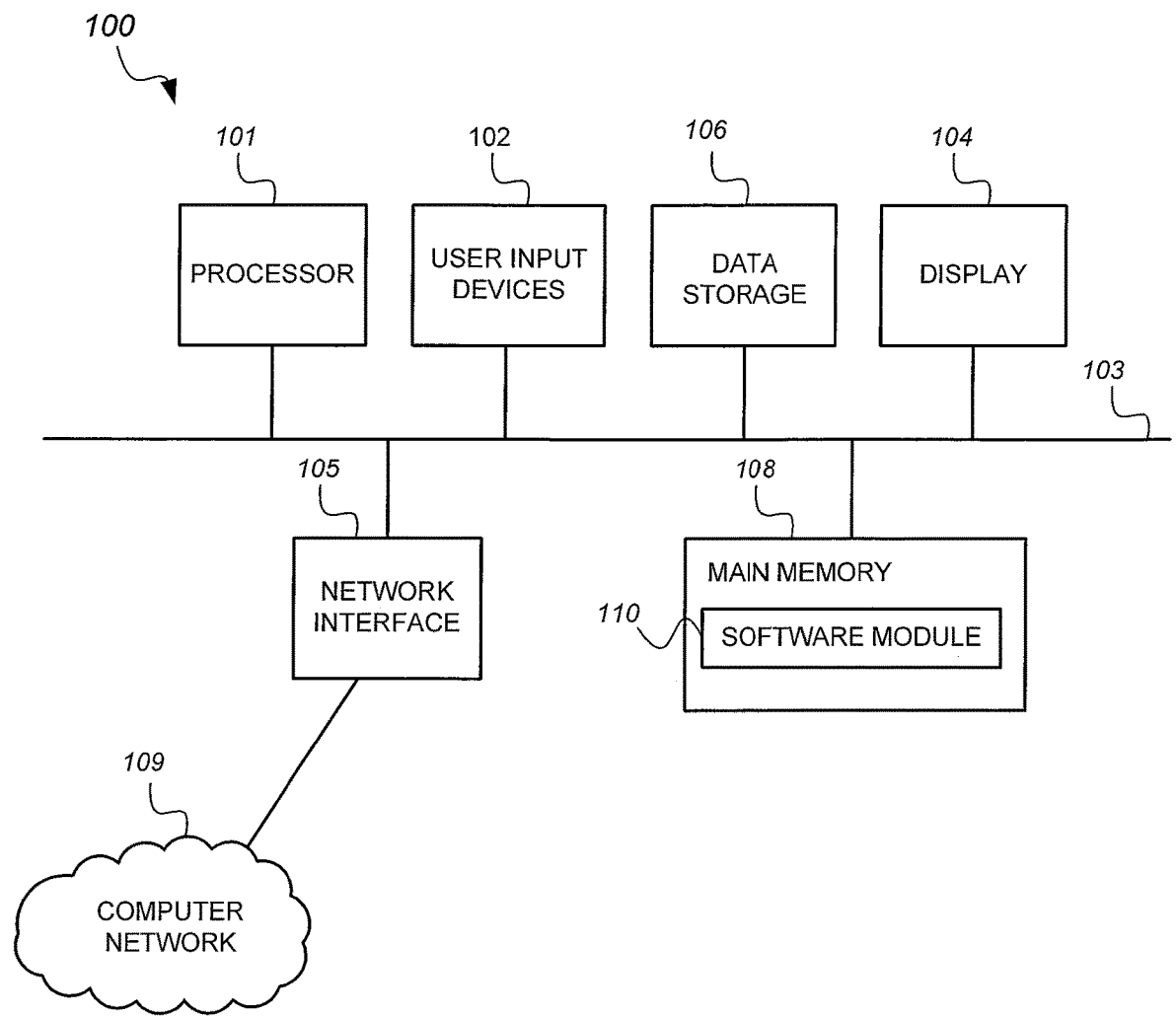
FIG. 6 shows a logical diagram of a computer system that may be employed with embodiments of the present invention.

Referring now to FIG. 6, there is shown a logical diagram of a computer system 100 that may be employed with embodiments of the present invention. The computer system 100 may be employed as the front end system 210, the backend system 216, or other computer described herein. The computer system 100 may have fewer or more components to meet the needs of a particular cybersecurity application. The computer system 100 may include one or more processors 101. The computer system 100 may have one or more buses 103 coupling its various components. The computer system 100 may include one or more user input devices 102 (e.g., keyboard, mouse), one or more data storage devices 106 (e.g., hard drive, optical disk, solid state drive), a display monitor 104 (e.g., liquid crystal display, flat panel monitor), a computer network interface 105 (e.g., network adapter, modem), and a main memory 108 (e.g., random access memory). The computer network interface 105 may be coupled to a computer network 109, which in this example includes the Internet.

The computer system 100 is a particular machine as programmed with one or more software modules 110, comprising instructions stored non-transitory on the main memory 108 for execution by the processor 101 to cause the computer system 100 to perform corresponding programmed steps. An article of manufacture may be embodied as computer-readable storage medium including instructions that when executed by the processor 101 cause the computer system 100 to be operable to perform the functions of the one or more software modules 110.

Methods and systems for evaluating files for cyber threats have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of evaluating files for cyber threats, the method comprising:
   evaluating a first file for cyber threats using a machine learning model;
   in response to and after the machine learning model classifies the first file as normal, searching a locality sensitive hash (LSH) repository for a locality sensitive hash that is similar to a first locality sensitive hash of the first file;
   declaring the first file to be malicious when a malicious locality sensitive hash in the LSH repository is similar to the first locality sensitive hash; and
   declaring the first file to be normal when there is no malicious locality sensitive hash in the LSH repository that is similar to the first locality sensitive hash.

2. The method of claim 1, wherein locality sensitive hashes in the LSH repository are grouped into clusters, and searching the LSH repository comprises:
   searching the LSH repository for a center of a cluster that is similar to the first locality sensitive hash.

3. The method of claim 1, further comprising:
   receiving a query for the first file over a computer network; and
   returning, in response to the query, over the computer network a result of the evaluation of the target file for cyber threats.

4. The method of claim 1, further comprising:
   receiving a feedback on a false positive indicating that a second file that has been declared as malicious is actually normal; and
   in response to the feedback on the false positive, disabling a response action for the second file.

5. The method of claim 4, wherein disabling the response action for the second file comprises:
   adding a second locality sensitive hash of the second file in a whitelist.

6. The method of claim 1, further comprising:
   identifying a false negative involving a third file that has been declared as normal but is actually malicious; and
   in response to identifying the false negative, updating the LSH repository with a third locality sensitive hash of the third file.

7. The method of claim 6, wherein identifying the false negative comprises:
   reevaluating the third file for cyber threats using a cybersecurity module that is not the machine learning model.

8. The method of claim 6, further comprising:
   after identifying the false negative, checking for collision between the third file and normal files of a normal file repository.

9. The method of claim 8, wherein checking for collision between the third file and the normal files of the normal file repository comprises:
   searching the normal file repository for a normal locality sensitive hash that is similar to the third locality sensitive hash.

10. The method of claim 1, further comprising:
    evaluating a fourth file for cyber threats using the machine learning model;
    declaring the fourth file to be malicious when the machine learning model classifies the fourth file as malicious and a response action is enabled for the fourth file; and
    declaring the fourth file to be normal when the machine learning model classifies the fourth file as malicious but the response action is disabled for the fourth file.

11. A system for evaluating files for cyber threats, the system comprising:
    a first user computer; and
    a first computer system that is configured to receive a first query for a first file from the first user computer over a computer network, use a machine learning model to evaluate the first file for cyber threats, search a locality sensitive hash (LSH) repository for a malicious locality sensitive hash that is similar to a first locality sensitive hash of the first file in response to the machine learning model classifying the first file as normal, return a first negative result indicating that the first file is normal in response to the first query when there is no malicious locality sensitive hash in the LSH repository that is similar to the first locality sensitive hash, and return a first positive result indicating that the first file is malicious in response to the first query when a malicious locality sensitive hash in the LSH repository is similar to the first locality sensitive hash.

12. The system of claim 11, wherein the first computer system is further configured to receive a second query for a second file from a second user computer over the computer network, use the machine learning model to evaluate the second file for cyber threats, and return a second negative result indicating that the second file is normal in response to the second query when the machine learning model classifies the second file as malicious but a response action for the second file is disabled.

13. The system of claim 12, wherein the first computer system is further configured to return a second positive result indicating that the second file is malicious in response to the query when the machine learning model classifies the second file as malicious, and the response action for the second file is enabled.

14. The system of claim 12, wherein the response action for the second file includes preventing execution of the second file.

15. The system of claim 11, further comprising:
a second computer system that is configured to receive a feedback from a second user computer over the computer network indicating that a second file that has been previously evaluated by the first computer system to be malicious is actually normal, and disable a response action for the second file in response to the feedback.

16. The system of claim 11, further comprising:
a second computer system that is configured to reevaluate for cyber threats a second file that has been previously evaluated by the first computer system to be normal, detect that the second file is actually malicious, and initiate updating the LSH repository to include a malicious second locality sensitive hash of the second file.

17. A method of evaluating files for cyber threats, the method comprising:
receiving a query for a file;
evaluating the file for cyber threats using a machine learning model;
responding to the query that the file is normal when the machine learning model classifies the file as normal and there is no malicious locality sensitive hash that is similar to a locality sensitive hash of the file; and
responding to the query that the file is malicious when the machine learning model classifies the file as normal and there is a malicious locality sensitive hash that is similar to the locality sensitive hash of the file.

18. The method of claim 17, further comprising:
responding to the query that the file is normal when the machine learning model classifies the file as malicious but a response action for the file is disabled.

19. The method of claim 18, further comprising:
responding to the query that the file is malicious when the machine learning model classifies the file as malicious and the response action for the file is enabled.

20. The method of claim 19, wherein the response action for the file includes preventing the file from being executed.

* * * * *